/ 
US007643474B2

(12) United States Patent
Huang

(10) Patent No.: US 7,643,474 B2
(45) Date of Patent: Jan. 5, 2010

(54) METHOD AND SYSTEM FOR A TRADITIONAL TERMINAL USER TO ACCESS AN IMS DOMAIN

(75) Inventor: Shibi Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 11/481,241

(22) Filed: Jul. 5, 2006

(65) Prior Publication Data
US 2007/0008957 A1   Jan. 11, 2007

(30) Foreign Application Priority Data
Jul. 5, 2005   (CN)   ................ 2005 1 0080486

(51) Int. Cl.
*H04L 12/66* (2006.01)
(52) U.S. Cl. ................ 370/352; 370/401; 709/223
(58) Field of Classification Search ............... 370/352, 370/401, 353, 354, 355, 356; 455/412.2, 455/412.1, 435.1; 379/93.17, 218.01; 709/217, 709/223
See application file for complete search history.

(56) References Cited

U.S. PATENT DOCUMENTS

| 6,721,401 | B2* | 4/2004 | Lee et al. ............... 379/93.17 |
|---|---|---|---|
| 6,754,180 | B1* | 6/2004 | Christie ............... 370/236 |
| 7,301,938 | B2* | 11/2007 | Ejzak ............... 370/352 |
| 2003/0061503 | A1* | 3/2003 | Katz et al. ............... 713/200 |
| 2003/0210678 | A1 | 11/2003 | Haukka |
| 2004/0153667 | A1 | 8/2004 | Kastelewicz et al. |
| 2004/0228324 | A1* | 11/2004 | Alexiou et al. ............... 370/352 |
| 2004/0260784 | A1* | 12/2004 | Lee et al. ............... 709/217 |
| 2005/0009520 | A1* | 1/2005 | Herrero et al. ............ 455/435.1 |
| 2005/0170816 | A1* | 8/2005 | Pelaez et al. ............. 455/412.2 |
| 2005/0286703 | A1* | 12/2005 | Munch ............... 379/211.02 |
| 2006/0030320 | A1* | 2/2006 | Tammi et al. ............ 455/435.2 |
| 2006/0268781 | A1* | 11/2006 | Svensson et al. ............ 370/331 |
| 2006/0268835 | A1* | 11/2006 | Hyotylainen et al. ......... 370/352 |
| 2007/0053343 | A1* | 3/2007 | Suotula et al. ............. 370/352 |

FOREIGN PATENT DOCUMENTS

| GB | 2 419774 A | 5/2006 |
|---|---|---|
| WO | WO 0232084 A2 | 4/2002 |
| WO | WO 02102107 A1 | 12/2002 |
| WO | WO 2006/026901 A1 | 3/2006 |

OTHER PUBLICATIONS

International Search Report for PCT/CN2006/001299, dated Sep. 7, 2006.
European Search Report for the counter part EP Application No. EP 06 11 6666, dated Sep. 14, 2006.

* cited by examiner

*Primary Examiner*—Fan Tsang
*Assistant Examiner*—Simon King
(74) *Attorney, Agent, or Firm*—Conley Rose, P.C.; Grant Rodolph

(57) ABSTRACT

Provided are an implementing method and a communication system for a traditional terminal user accessing an IMS domain. The method allocates an IMS domain user identification including a public identification and a private identification to a traditional terminal user on an AGF entity controlled by an AGCF entity, and establishes a mapping relation between the IMS domain user identification and the line identification of the user. When receiving a command or message for a certain user terminal sent from the AGF entity, the AGCF entity determines the IMS domain user identification of the user according to the mapping relation and sends a corresponding SIP message to the IMS domain.

29 Claims, 3 Drawing Sheets

METHOD AND SYSTEM FOR A TRADITIONAL TERMINAL USER TO ACCESS AN IMS DOMAIN

CROSS-REFERENCE TO RELATED APPLICATIONS/INCORPORATION BY REFERENCE

This patent application makes reference to, claims priority to and claims benefit from Chinese Patent Application No. 200510080486.5 filed on Jul. 5, 2005.

FIELD OF THE INVENTION

The present invention relates to the IP Multimedia Subsystem (IMS) technique in the communication field, and more particularly to a method and system for a traditional terminal user to access an IMS domain.

BACKGROUND OF THE INVENTION

IP Multimedia Subsystem (IMS) for WCDMA network is defined by 3GPP R5/R6 standard and is an object network by which the 3G mobile networks can realize packet voice and packet data and provide uniform multimedia services and applications. The IMS uses an IP packet domain as its bearer path of control signalings and media transmissions, and adopts session initiation protocol (SIP) as a call control signaling. In the IMS, the user subscription data of the IMS are all managed in a home subscriber server (HSS). Services of the IMS are all provided by an application server (AS), and the session control is accomplished by a serving call session control function (Serving CSCF or S-CSCF), both of which are totally separated in the network architecture. Services are triggered by the S-CSCF to the AS to be processed and a plurality of ASs can co-work with each other. The user accesses the IMS via a proxy node (proxy-CSCF) of his current location, and the session and service control is accomplished by the home domain service node of his registration location. Therefore, the users can always obtain the same services in various access points, and thus the service management, the session control and the bearer access can be separated and the services independent of the position and access can be provided. However, the IMS system architecture defined by the 3GPP does not consider the access of traditional terminal users such as POTS users and ISDN users but only the access of WCDMA and WLAN users.

PSTN and ISDN services generally refer to various types of services provided for plain old telephone network (POTS) users and integrated services digital network (ISDN) users in the traditional public switched telephone network (PSTN) and ISDN networks. Currently, PSTN and ISDN services can be realized by the soft switch network in the packet domain. The soft switch as a call processing node in the soft switch network accomplishes simultaneously the provision of PSTN and ISDN services, and the service control and session control function is realized by the same network node. Since PSTN and ISDN services disperse in various soft switches and are accomplished individually, it is difficult for the call processing nodes to co-work with each other so as to accomplish the services. Moreover, since the user data disperse in various soft switches and the acquirements of user services are restricted to the user's access point, it is difficult to expand uniformly the services.

Currently, non-IMS traditional terminal users are not able to register to and access the IMS domain. Therefore, the problem of how to control the traditional access gateway function (AGF) entity (access device) in the soft switch network to make POTS users and ISDN users access the IMS domain needs to be solved so that the traditional terminal users can similarly receive uniformly value added services and mobility routing services of the IMS network on the premise that the network node functions remain invariable.

SUMMARY OF THE INVENTION

The object of the invention is to provide a method and a system for traditional terminal users to access the IMS domain.

The method for a traditional terminal user to access an IMS domain includes the steps of: allocating an IMS domain user identification comprising a public identification and a private identification to a traditional terminal user on the AGF entity controlled by an access gateway control function (AGCF) entity, and establishing a mapping relation between the IMS domain user identification and the line identification of the user, the line identification being used for determining the AGF entity and port corresponding to the user; and when receiving a command or message for a certain user terminal sent from the AGF entity, the AGCF entity determining the IMS domain user identification of the user according to the mapping relation and sending the corresponding SIP message to the IMS domain; or when receiving a SIP message sent from the IMS domain, the AGCF entity determining the line identification of the user according to the mapping relation and sending the corresponding command or message to the AGF entity based on the control protocol of the AGF entity, and the command or message being converted into an analog line signaling by the AGF entity and being transmitted to the user terminal.

The AGCF entity and the AGF entity are arranged in a reliable network domain to guarantee the communication security therebetween.

The AGCF entity allocates the same private identification to all or part of traditional terminal users under its control.

The invention provides also a method for a traditional terminal user to register to an IMS domain, including the steps of: allocating an IMS domain user identification comprising a public identification and a private identification to a traditional terminal user on the AGF entity controlled by the AGCF entity, and establishing the mapping relation between the IMS domain user identification and the line identification of the user, the line identification being used for determining the AGF entity and port corresponding to the user; and when the AGF entity issues that the status of the port corresponding to the user is normal, the AGCF entity determining the IMS domain user identification of the user according to the mapping relation, constructing the corresponding SIP registration message and sending it to the IMS domain.

After the user successfully registers, the registration information relative to the user is stored on the AGCF entity.

When the AGF entity issues that the status of the port corresponding to the user is abnormal in the subsequent procedure, the AGCF entity replies a response to the AGF entity, constructs the SIP deregistration message, sends it to the IMS domain, and deletes the registration information relative to the user.

When receiving the Notify message indicative of that the IMS domain requests to deregister the registered user in the subsequent procedure, the AGCF entity deletes the registration information relative to the users.

The AGCF entity stores the terminal status issued by the AGF entity and the registration status of the user corresponding to the terminal in the IMS domain, and when receiving a message showing that the communication connection between the AGCF entity and the AGF entity is temporarily interrupted and then recovered, the AGCF entity performs synchronization for the status of the terminal, and during the procedure of performing synchronization for the terminal status, if detecting that the terminal status changes from the stored normal status to the detected abnormal status and the corresponding user has registered in the IMS network, the AGCF entity constructs an SIP deregistration message, sends it to the IMS domain and deletes the registration information relative to the user; and if detecting that the terminal status changes from the stored abnormal status to the detected normal status and the corresponding user has not registered in the IMS network yet, the AGCF entity indicates to initiate the registration procedure to the IMS network for the user.

The invention further provides a communication system comprising an IMS network, an AGF entity and a plurality of terminal devices in the circuit domain, the IMS network comprising a call session control function entity and the terminal devices connected to the access gateway function entity, further comprising:

an AGCF entity being connected between the CSCF entity and the AGF entity such that the terminals on the AGF entity are accessed to the IMS domain under the control of the AGCF entity, allocating an IMS domain user identification comprising a public identification and a private identification to the user corresponding to the terminal device under the AGF entity and storing the mapping relations between the IMS domain user identification and the line identification of the user.

The communication system further includes more AGF entities and the AGCF entity and the AGF entities are arranged in the reliable security network in which the AGF entities directly access the IMS network through the AGCF entity.

The present invention has one or more than one of the following advantages:

1. In the present invention, AGCF entity does not need to allocate an IMS identification to the AGF, and all the users under the AGCF entity can share one private identification. Therefore, the invention can simplify the authentication of the user and reduce the resource requirements for the IMS identification, the network processing capability and the network storage etc.

2. The AGF entity directly accesses the AGCF entity and the IMS network and is not needed to be certificated and authenticated, therefore, the invention can satisfy the network implementation demand of arranging the AGF entity in the reliable domain for the network security so as to simplify the flow and avoid the unreasonable requirement of that the IMS authentication manner is extended to the AGF entity and the AGF entity is required to expand the control protocols (such as H.248).

3. The present invention can make traditional terminal users access the IMS domain, and thus traditional terminal users can also accept the uniformly value added services and mobility routing services of the IMS network. Therefore, the traditional terminals can still be used in the IMS network and the original investment of traditional terminal users can be protected, which is convenient for the transition from the conventional network to IMS network.

DETAILED DESCRIPTION OF THE INVENTION

Figure 1:
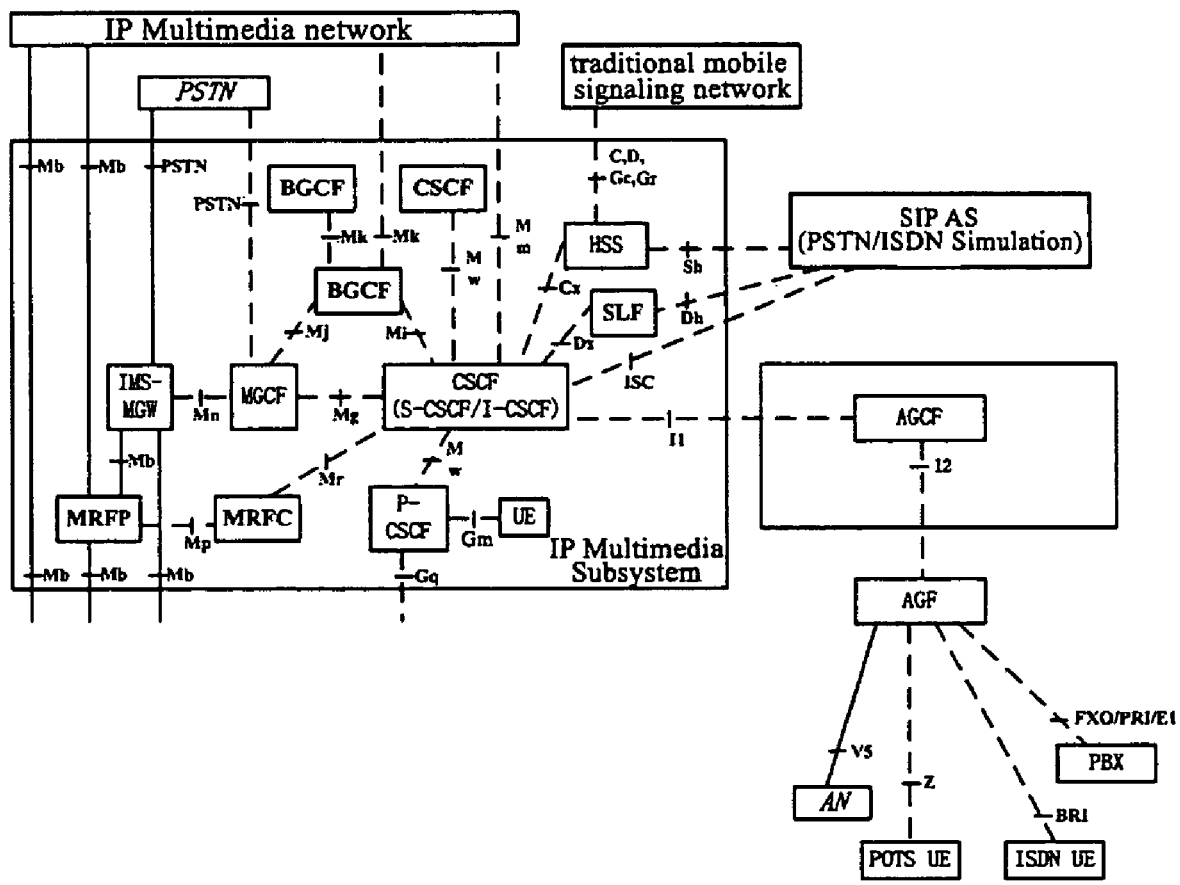
FIG. 1 is a structure schematic diagram of a communication system according to an embodiment of the invention.

Referring to FIG. 1, the communication system of the present invention comprises an IMS network, an access gateway control function (AGCF) entity, an access gateway function (AGF) entity, and a plurality of traditional terminal devices in the circuit domain. The IMS network includes a call session control function (CSCF) entity for the access control and the session control. An AGCF entity is connected between the CSCF entity and the AGF entity connected to the terminal devices.

In the communication system as shown in FIG. 1, one AGCF entity can manage and control a plurality of AGF entities. Each AGF entity has a unique identification different from other AGF entities in the AGCF entity and can be accessed by a plurality of users which are distinguished by ports.

The AGCF entity as a newly added network node in the IMS controls an original access device (e.g. an AGF entity) in the soft switch network, such as an access gateway (AG) and an integrated access device (IAD), to make POTS users and ISDN users to have access to the IMS domain, and it realizes the conversion between the original control protocol and the SIP control protocol as an access inter-working protocol conversion unit. The AGCF entity supports the access control protocols of non-IMS techniques, which include but are not limited to H.248, MGCP, and H.323. At the same time, the AGCF entity supports the control protocol SIP of the IMS domain, the SIP-I encapsulating the side-to-side ISDN service information by using the SIP, the Diameter protocol used for interacting with the CCF/PDF, and the COPS protocol used for interacting with the media agent in the NAT control.

In order to make the traditional terminal devices to be able to access the IMS core network, it is necessary to allocate the IMS domain user identification information such as a public identification and a private identification to each accessing user. In the present invention, the AGCF entity accomplishes the allocation and management of the user identification in the IMS domain for the traditional terminal user accessed via the AGF entity.

Each user accessing the AGCF entity can be allocated a private identification and a public identification. Since the AGCF entity is a function agent for the user devices (UE) and P-CSCF entities, all the users under the AGCF entity can be allocated the same private identification and these terminals can share a private identification so as to simplify the certification process in the IMS domain for the users under the AGCF entity.

The traditional terminal user accessing the AGCF entity can use a line identification containing a gateway identification and a terminal identification to uniquely identify the gateway accessed by the user terminal and the line port on the gateway and establishes the mapping relations between the line identification of the user and IMS domain user identification allocated to the user in the AGCF entity.

After establishing the mapping relations, when a user on the AGF initiates a call to the AGCF entity, the AGCF entity obtains the private identification and public identification corresponding to the user according to the AGF identification and the user port identification and sends a corresponding SIP message to the IMS domain after the protocol conversion; and when the AGCF entity receives a termination call to the user accessed by AGF, the AGCF entity orients the AGF accessed by the user and the user port based on the public identification and the stored information when registering the called party and sends corresponding commands or messages to the AGF entity according to the control protocol of the AGF entity, which will be converted into analog line signalings and sent to the user terminal by the AGF entity.

The AGF entity as an office's device with a large capacity is arranged in a reliable security network domain of the operator's network. The AGCF entity does not perform the certification and authentication for the AGF entity, and the communication security is guaranteed by that reliable security network domain. Furthermore, an IPSec security tunnel can be arranged between the AGF entity and the AGCF entity by the network management system so as to further improve the security of the communication between the AGCF entity and the AGF entity.

The AGCF entity can also provide the control of PSTN and ISDN basic services and complementary services for POTS users and ISDN users accessing the AGF entities and the service related data necessary for the service control are stored in the AGCF entity.

Figure 2A:
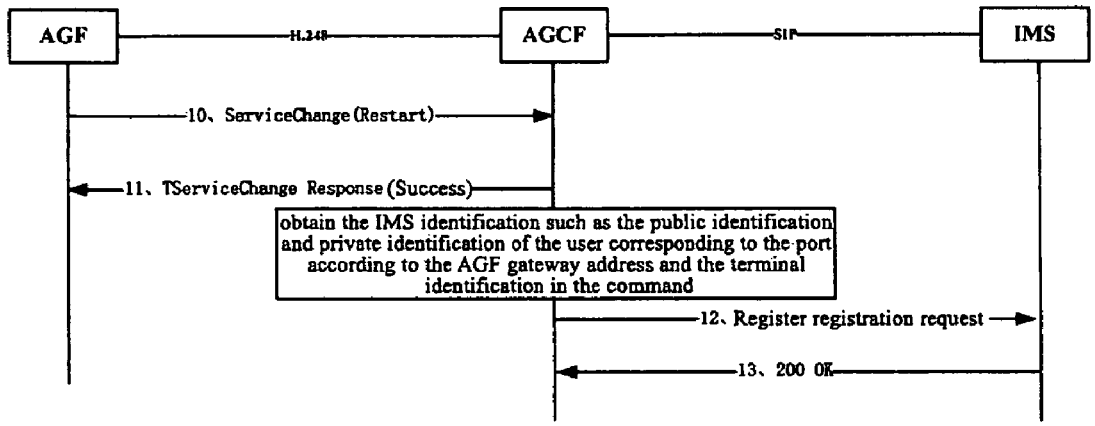
FIG. 2A is a flow chart showing the procedure that a user initiates a registration and the registration is successful.

Before using the IMS domain services, the users corresponding to the traditional terminals need the allocated IMS user identification information to register to the IMS network. FIG. 2A shows the process procedure of a successful registration as follows (taking the H.248 protocol adopted between the AGF and AGCF as an example):

Step 10, the AGCF entity receives a ServiceChange command, which issues that the port status is normal, from the AGF entity.

Step 11, the AGCF entity replies a successful response of the ServiceChange command to the AGF entity.

Step 12, according to the AGF gateway address and terminal identification in the ServiceChange command, the AGCF entity obtains the IMS domain identification such as a public identification and a private identification of the user corresponding to the port, constructs a Register request message, sets the integrity protection indication in the message as "Yes", and issues a Register registration request to the IMS network.

Step 13, when receiving the 200 OK successful responses for the above SIP registration message from the IMS network, the AGCF entity stores the related registration information when registering the user.

Through the above procedure, the AGCF entity records the related address information after finishing the registration in the IMS domain for the user, and the related address information comprises the information of the address and port accessed by the user, the address information of the IMS domain service node allocated to the user and etc.

During the subsequent service procedure after registering successfully, the AGCF entity accomplishes the mapping between the session establishment procedure in the IMS domain and the basic call procedure of a user accessing the AGF entity and a non-SIP user directly accessing the AGCF entity, and during the mapping procedure and after the session establishment, the bi-direction conversion between the IMS SIP and various non-IMS control protocols is performed and the uniform call control is realized accordingly.

The AGCF entity looks up the records stored when registering the user according to the calling user identification, routes the session request of the user accessing the AGF entity and the non-SIP user directly accessing the AGCF entity to the IMS service node, i.e., S-CSCF entity allocated to the user. The S-CSCF entity performs the necessary AS service triggering for the calling user.

The session request from the called S-CSCF to the user accessing the AGF entity and to the non-SIP user directly accessing the AGCF entity is routed to the terminal of the called user by looking up the address information recorded at the time of registration according to the called user identification.

Figure 2B:
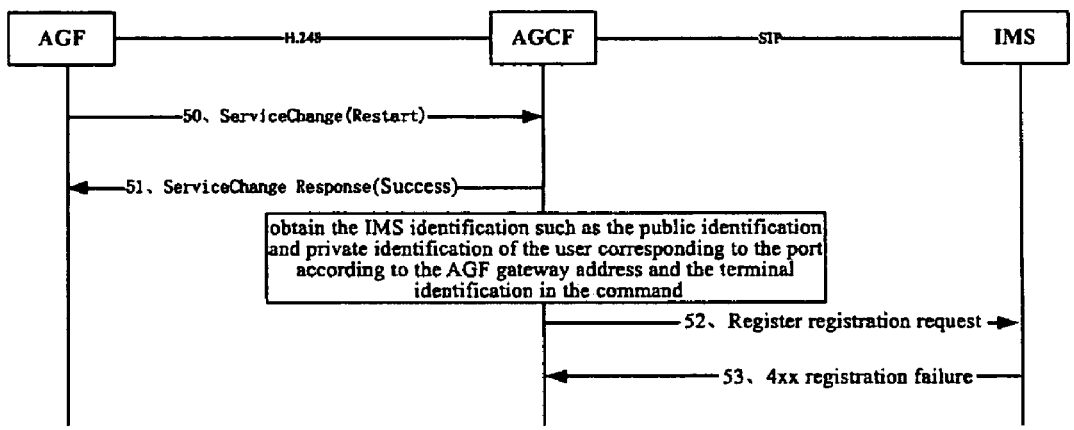
FIGS. 2B and 2C are flow charts showing the procedures that a user initiates a registration and the registration is failed.

FIG. 2B shows the processing procedure of a failure registration as follows (taking the H.248 protocol adopted between the AGF and AGCF as an example):

Step 50, the AGCF entity receives a ServiceChange command, which issues that the port status is normal, from the AGF entity.

Step 51, the AGCF entity replies a successful response of the ServiceChange command to the AGF entity.

Step 52, according to the AGF gateway address and terminal identification in the ServiceChange command, the AGCF entity obtains the IMS domain identification such as a public identification and a private identification of the user corresponding to the port, constructs a Register request message, sets the integrity protection indication in the message as "Yes", and issues a Register registration request to the IMS network.

Step 53, the AGCF entity receives an unsuccessful response 4xx of the IMS network to the above SIP register message.

Figure 2C:
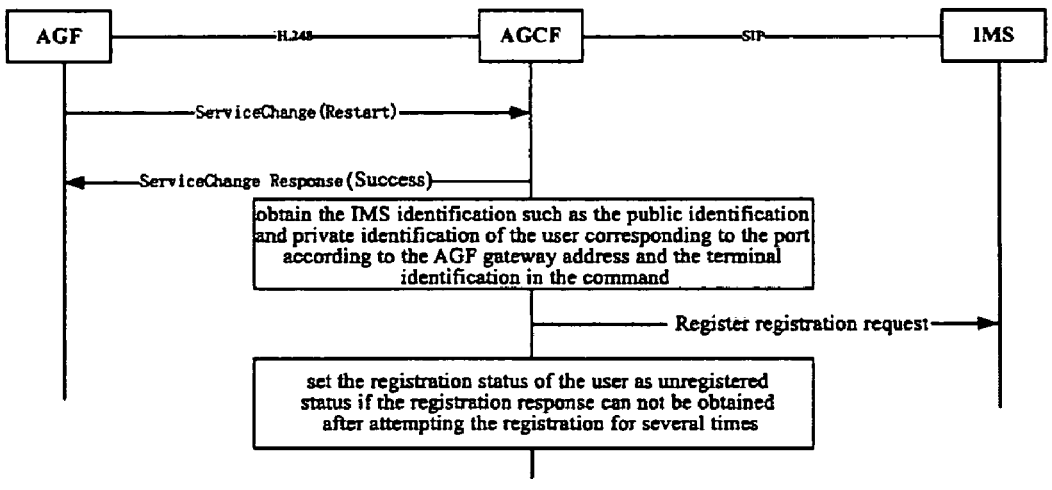

Another processing flow of a failure registration is shown in FIG. 2C and differs from FIG. 2B in that after constructing a registration request and sending it to the IMS domain, the AGCF entity sets the registration status of the user as unregistered status if not receiving the response after the time is overridden. The rest processing procedure in FIG. 2C is the same as that in FIG. 2B and the relative description is omitted here.

After a certain user of the AGCF entity registers successfully to the IMS network, the AGCF entity initiates the subscription process of the user registration status according to the provision of 3GPP TS 24.229 5.1.1.3 and initiates the user re-registration process before the consulted period of validity of the registration is overridden according to the provision of 3GPP TS 24.229 5.1.1.4 (as for the detail, please refer to the related description).

During the subsequent call procedure after the successful registration of the user, the AGCF entity can generate a billing request message according to the requirements defined by the IMS standard and send the billing information to the IMS CCF so as to make a bill for the user.

Figure 3:
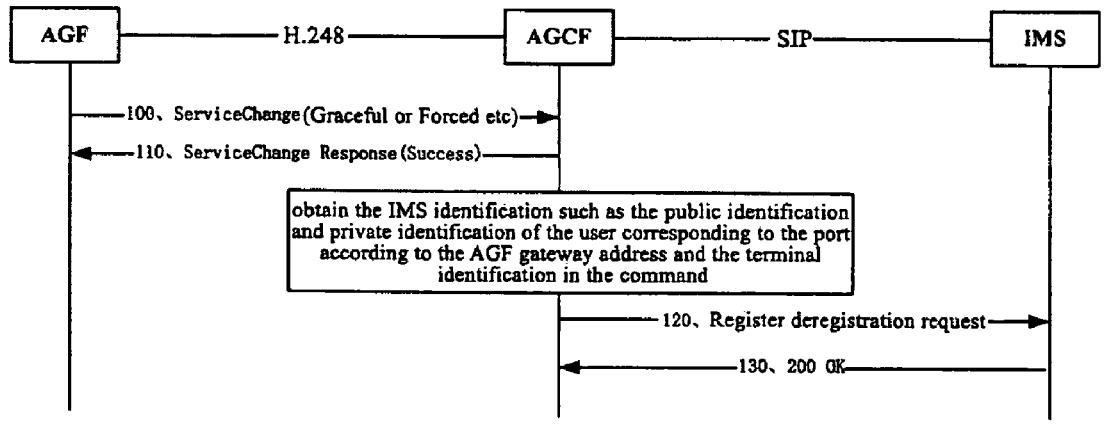
FIG. 3 is a flow chart showing the deregistration procedure of a registered user, which is initiated from the AGCF entity.

After the user registers to the IMS domain, the deregistration of the registered user can be initiated from the AGCF entity which is shown in FIG. 3 (taking the H.248 protocol adopted between the AGF and AGCF as an example):

Step 100, the AGCF entity receives a ServiceChange command, which issues that the port status is abnormal, from the AGF entity.

Step 110, the AGCF entity replies a successful response of the ServiceChange command to the AGF entity.

Step 120, according to the AGF gateway address and terminal identification in the ServiceChange command, the AGCF entity obtains the IMS domain identification such as a public identification and a private identification of the user corresponding to the port, constructs a Register deregistration message, sends a deregistration request to the IMS core network, and deletes all the registration information relative to the deregistration user.

Step 130, the IMS network deregisters the user and returns the response information to the AGCF entity.

Figure 4:
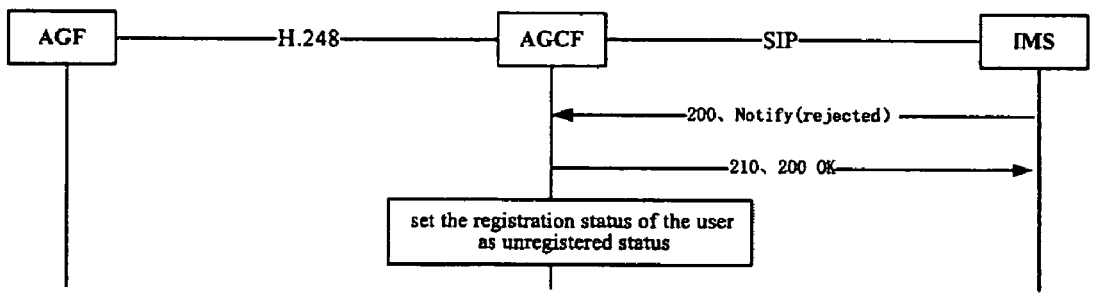
FIG. 4 is a flow chart showing the deregistration procedure of a registered user, which is initiated from the network.

After the user registers to the IMS domain, the deregistration of the registered user can also initiated from the network which is shown in FIG. 4 (taking the H.248 protocol adopted between the AGF and AGCF as an example):

Step 200, the AGCF entity receives a NOTIFY message from the IMS network, which requests to deregister a certain registered AGCF user.

Step 210, the AGCF entity deletes all the registration information relative to the deregistration user and replies directly 200 OK to the IMS network indicative of successful deregistration.

The AGF entity can issue the statuses of a plurality of terminals by a H. 248 message. In order to avoid the AGCF entity to issue simultaneously a plurality of registration or deregistration SIP messages to the IMS network and thus impact the IMS network, a delay timer can be started up on the AGCF entity to make the AGCF entity send limited registration or deregistration SIP messages in a specific time period.

In order to obtain the status change of the terminal, the terminal status issued by the AGF and the registration status in the IMS network for the user corresponding to the terminal are stored in the AGCF entity. If receiving the ServiceChange command in which the parameter ServiceChangeMethod is "Disconnected" (indicating that the communication connection between the AGCF and the AGF temporarily interrupts and then recovers) from the AGF entity, the AGCF entity performs the synchronization for the status of the terminal by an Audit command.

A. If detecting that the terminal status changes from the stored normal status to the detected abnormal status and the corresponding user has registered in the IMS network according to the Audit command, the AGCF entity initiates the deregistration procedure to the IMS network for the user corresponding to the terminal (see the above deregistration processing procedure).

B. If detecting that the terminal status changes from the stored abnormal status to the detected normal status and the corresponding user has not registered in the IMS network yet according to the Audit command, the AGCF entity initiates the registration procedure to the IMS network for the user corresponding to the terminal.

When the AGCF entity detects that the H.248 communication between itself and the AGF entity is entirely interrupted, the AGCF entity initiates the deregistration procedure to the IMS network for all the registered users under it, i.e. constructs the SIP deregistration message for all the registered users on it, sends them to the IMS domain, and then deletes the registration information of the registered users.

Similarly, the registration and deregistration processes for the MGCP protocol adopted between the AGF entity and the AGCF entity are the same as those the abovementioned H.248 protocol and thus the relative description is omitted here.

In the IMS network, since the AGCF substitutes the functions of user terminals and P-CSCF, the registration and deregistration processes for the traditional user terminals are similar to those for the conventional SIP terminals, which will not be described in the embodiment in details.

Though illustration and description of the present invention have been given with reference to preferred embodiments thereof, it should be appreciated by ordinary personnel skilled in the art that various changes in forms and details can be made without deviation from the spirit and scope of this invention as defined by the appended claims.

The invention claimed is:

1. A method for a traditional terminal user to access an IP multimedia subsystem domain, comprising the steps of:
   an access gateway control function entity allocating an IP multimedia subsystem domain user identification comprising a public identification and a private identification to a traditional terminal user on an access gateway function entity controlled by the access gateway control function entity, and establishing a mapping relation between the IP multimedia subsystem domain user identification and a line identification of the user, the line identification being used for determining the access gateway function entity and port corresponding to the user; and
   when receiving at least one of a command and a message for a certain user terminal sent from the access gateway function entity, the access gateway control function entity determining the IP multimedia subsystem domain user identification of the user according to the mapping relation and sending a corresponding SIP message to a call session control function entity in the IP multimedia subsystem domain; or when receiving a SIP message sent from the call session control function entity in the IP multimedia subsystem domain, the access gateway control function entity determining the line identification of the user according to the mapping relation and sending a corresponding at least one of a command and a message to the access gateway function entity based on the control protocol of the access gateway function entity, and the at least one of a command and a message being converted into an analog line signaling by the access gateway function entity and being transmitted to the user terminal.

2. The method according to claim 1, wherein, the access gateway control function entity and the access gateway function entity are arranged in a reliable security network domain to guarantee communication security therebetween.

3. The method according to claim 2, wherein, a security path is arranged between the access gateway control function entity and the access gateway function entity to further guarantee the communication security.

4. The method according to claim 1, wherein, the access gateway control function entity allocates the same private identification to at least a part of traditional terminal users under its control.

5. The method according to claim 4, wherein, the access gateway control function entity allocates at least one public identifications to each accessing user.

6. The method according to claim 1, wherein, the access gateway control function entity allocates at least one public identifications to each accessing user.

7. A method for a traditional terminal user to register to an IMS domain, comprising the steps of: an access gateway control function allocating an IP multimedia subsystem domain user identification comprising a public identification and a private identification to a traditional terminal user on an access gateway function entity controlled by the access gateway control function entity, and establishing a mapping relation between the IP multimedia subsystem domain user identification and the line identification of the user, the line identification being used for determining the access gateway function entity and port corresponding to the user; and when the access gateway function entity issues that the status of the port corresponding to the user is normal, the access gateway control function entity determining the IP multimedia subsystem domain user identification of the user according to the mapping relation, constructing a corresponding SIP registration message and sending it to a call session control function entity in the IP multimedia subsystem domain.

8. The method according to claim 7, wherein, after the user successfully registers, the registration information relative to the user is recorded on the access gateway control function entity.

9. The method according to claim 8, wherein, the access gateway control function entity further initiates the subscription procedure of the user registration status and initiates the user re-registration procedure before the consulted period of validity of the registration is overridden.

10. The method according to claim 8, wherein, when the access gateway function entity issues that the status of the port corresponding to the user is abnormal in the subsequent procedure, the access gateway control function entity replies a response to the access gateway function entity, constructs a SIP deregistration message, sends it to the IP multimedia subsystem domain, and deletes the registration information relative to the user.

11. The method according to claim 8, wherein, when receiving a message indicative of that the IP multimedia subsystem domain requests to deregister the registered user in the subsequent procedure, the access gateway control function entity deletes the registration information relative to the user.

12. The method according to claim 8, wherein, the access gateway control function entity stores the terminal status issued by the access gateway function entity and the registration status of the user corresponding to the terminal in the IP multimedia subsystem domain, and when receiving a message showing that the communication connection between the access gateway control function entity and the access gateway function entity is temporarily interrupted and then recovered, the access gateway control function entity performs synchronization for the status of the terminal.

13. The method according to claim 12, wherein, during the procedure of performing synchronization for the terminal status, if detecting that the terminal status changes from the stored normal status to the detected abnormal status and the corresponding user has registered in the IP multimedia subsystem network, the access gateway control function entity constructs an SIP deregistration message, sends it to the IP multimedia subsystem domain and deletes the registration information relative to the user; and if detecting that the terminal status changes from the stored abnormal status to the detected normal status and the corresponding user has not registered in the IP multimedia subsystem network yet, the access gateway control function entity indicates to initiate the registration procedure to the IP multimedia subsystem network for the user.

14. The method according to claim 8, wherein, when detecting that communication with the access gateway function entity is interrupted, the access gateway control function entity constructs SIP deregistration messages for all registered users on the access gateway function entity and sends them to the IP multimedia subsystem domain so as to deregister the users in the IP multimedia subsystem domain.

15. The method according to claim 7, wherein, the access gateway function entity issues the statuses of a plurality of terminals in a message issuing the status of a terminal.

16. The method according to claim 15, wherein the access gateway control function entity issues at least one of a limited registration and a limited deregistration message within a time period, in response to a request of the access gateway control function entity to perform at least one of registration and deregistration for the users corresponding to the plurality of terminals to the IMS domain according to the issued statuses of the terminals.

17. The method according to claim 7, wherein, the access gateway control function entity and the access gateway function entity are arranged in a reliable security network domain to guarantee communication security therebetween.

18. The method according to claim 17, wherein, a security path is arranged between the access gateway control function entity and the access gateway function entity to further guarantee the communication security.

19. The method according to claim 7, wherein, the access gateway control function entity allocates the same private identification to at least a part of traditional terminal users under its control.

20. The method according to claim 7, wherein, the access gateway control function entity allocates at least one public identification to each accessing user.

21. A method for deregistering a registered traditional terminal user, comprising the steps of: an access gateway function entity controlled by an access gateway control function entity issuing that the status of a port corresponding to the traditional terminal user registered in the IMS domain is abnormal in which the access gateway control function entity allocates an IP multimedia subsystem domain user identification to the traditional terminal user and establishes a mapping relation between the IP multimedia subsystem domain user identification and the line identification of the user, and the line identification is used for determining the access gateway function entity and port corresponding to the user; and the access gateway control function entity determining the IP multimedia subsystem domain user identification of the user according to the mapping relation, constructing a SIP deregistration message, send the SIP deregistration message to a call session control function entity in the IP multimedia subsystem domain and deleting the registration information relative to the user.

22. The method according to claim 21, wherein, after receiving an issued message from the access gateway function entity, the access gateway control function entity replies a response message to the access gateway function entity.

23. A method for deregistering a traditional terminal user from an IP multimedia subsystem domain, comprising the steps of: a call session control function entity in the IP multimedia subsystem domain sending a SIP Notify message for deregistering the traditional terminal user to an access gateway control function entity in which the access gateway function entity allocates an IP multimedia subsystem domain user identification to the traditional terminal user and establishes a mapping relation between the IP multimedia subsystem domain user identification and the line identification of the user, and the line identification is used for determining the access gateway function entity and port corresponding to the user; and after receiving the SIP Notify message, the access gateway control function entity deleting stored registration information of the user and replying a response message to the call session control function entity in the IP multimedia subsystem domain.

24. A communication system comprising an IMS network, an access gateway function entity, a plurality of terminal devices in a circuit domain, and an ACGF entity, wherein the IP multimedia subsystem network comprises a call session control function entity and the terminal devices are connected to the access gateway function entity, wherein the access gateway control function entity is connected between the call session control function entity and the access gateway function entity such that the terminals on the access gateway function entity are accessed to the IP multimedia subsystem domain under the control of the access gateway control function entity, and wherein the access gateway control function entity is capable of allocating an IP multimedia subsystem domain user identification comprising a public identification and a private identification to the user corresponding to the terminal device under the access gateway function entity and storing mapping relations between the IP multimedia subsystem domain user identification and the line identification of the user.

25. The communication system according to claim 24, wherein, the communication system further comprises one or more access gateway function entities and the access gateway control function entity and the access gateway function entities are arranged in a reliable security network in which the access gateway function entities directly access the IP multimedia subsystem network through the access gateway control function entity.

26. An access gateway control function entity for a traditional terminal user to access an IP multimedia subsystem domain, comprising:
   means for allocating an IP multimedia subsystem domain user identification comprising a public identification and a private identification to a traditional terminal user on an access gateway function entity controlled by the access gateway control function entity; and
   means for establishing a mapping relation between the IP multimedia subsystem domain user identification and a line identification of the user, the line identification being used for determining the access gateway function entity and port corresponding to the user; wherein
when receiving at least one of a command and a message for a certain user terminal sent from the access gateway function entity, the access gateway control function entity determines the IP multimedia subsystem domain user identification of the user according to the mapping relation and sends a corresponding SIP message to the IP multimedia subsystem domain, or when receiving a SIP message sent from the IMS domain, the access gateway control function entity determines the line identification of the user according to the mapping relation and sends a corresponding at least one of a command and a message to the access gateway function entity based on the control protocol of the access gateway function entity, and the at least one of a command and a message is converted into an analog line signaling by the access gateway function entity and transmitted to the user terminal.

27. The entity according to claim 26, wherein, the access gateway control function entity and the access gateway function entity are arranged in a reliable security network domain to guarantee communication security therebetween.

28. The entity according to claim 26, wherein, the access gateway control function entity allocates the same private identification to at least a part of traditional terminal users under its control.

29. The entity according to claim 26, wherein, the access gateway control function entity allocates at least one public identification to each accessing user.

* * * * *

UNITED STATES PATENT AND TRADEMARK OFFICE
CERTIFICATE OF CORRECTION

PATENT NO. : 7,643,474 B2  Page 1 of 1
APPLICATION NO. : 11/481241
DATED : January 5, 2010
INVENTOR(S) : Shibi Huang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 265 days.

Signed and Sealed this

Sixteenth Day of November, 2010

David J. Kappos
*Director of the United States Patent and Trademark Office*